D. JORDAN.
CUTTER FOR WOOD MOLDING MACHINES.
No. 103,890. Patented June 7, 1870.
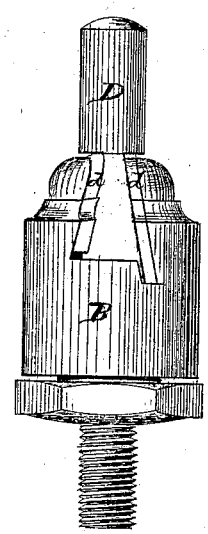
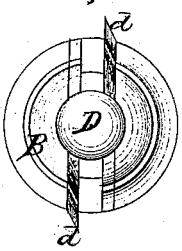
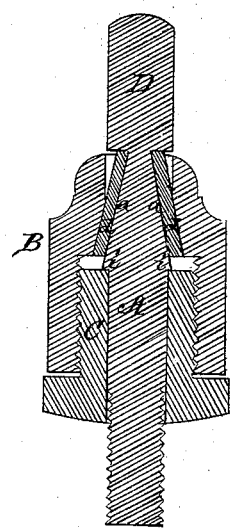
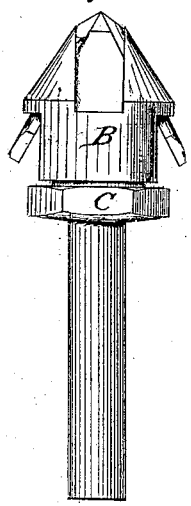

United States Patent Office.

DEDRICK JORDAN, OF CHARLESTOWN, MASSACHUSETTS, ASSIGNOR TO A. S. AND J. GEAR & CO., OF NEW HAVEN, CONNECTICUT.

Letters Patent No. 103,890, dated June 7, 1870.

IMPROVEMENT IN CUTTERS FOR WOOD-MOLDING MACHINES.

The Schedule referred to in these Letters Patent and making part of the same.

To all whom it may concern:

Be it known that I, DEDRICK JORDAN, of Charlestown, in the county of Middlesex and State of Massachusetts, have invented a new Improvement in Cutters for Wood-Molding Machines; and I do hereby declare the following, when taken in connection with the accompanying drawings and the letters of reference marked thereon, to be a full, clear, and exact description of the same, and which said drawings constitute part of this specification, and represent in—

Figure 1, a side view;
Figure 2, a top view;
Figure 3, a vertical central section;
Figure 4, a side view; and in
Figure 5, a central view of the cutter-head, constructed upon the same plan, in order to form a center cutter.

This invention relates to the adjustment of cutters, with special reference to use in the machine patented to A. S. Gear, November 23, 1869, the object being to afford a large bearing and positive security to the cutters.

To this end my invention consists in constructing a center spindle, with inclined surfaces upon which the cutters bear, combined with a head with correspondingly inclined surfaces, to set in over the spindles and bear upon the outside of the cutters, with a nut arranged to screw into the head, so as to draw the head down onto the cutters between the inclined surface of the cutter and spindle.

A is a spindle, threaded at one end, so as to be applied to the mandrel.

Upon two sides of the said spindle, inclined surfaces, $a$, are formed.

B is the cutter-head, constructed to pass on over the spindle, and with correspondingly inclined surfaces, as seen in figs. 1 and 3, and between the inclined surfaces of the spindle and head, cutters $d$ are placed.

The head is bored out and threaded to receive a nut, C, which passes freely onto the spindle, resting against a shoulder, $i$, on the spindle, so that, by the turning of the said nut, the head is drawn down, binding the cutters between the spindle and head.

As a guide for the form which governs the cut, I extend the spindle through the head, as at D, figs. 1, 2, and 3.

By this construction I am enabled to make cutters which will work to a center by shortening the spindle and extending the cutters until they meet, as seen in figs. 4 and 5, and by this construction I am enabled to hold the cutters more perfectly than by any device yet known.

While I have described the construction with two cutters, it will be evident to those skilled in the art that a single cutter may, in like manner, be secured, or more than two; I therefore do not wish to be understood as confining myself to two cutters.

I claim as my invention—

1. The head B, spindle A, with correspondingly inclined surfaces, and provided with a shoulder, $i$, and combined with the nut C turning into the head B, and bearing against the shoulder $i$, so as to secure the cutters between the said inclined surfaces, substantially as described.

2. In a cutter-head, consisting of a spindle A, head B, and spindle C, constructed and operated as set forth, the extension of the spindle to form the guide D, as and for the purpose specified.

DEDRICK JORDAN.

Witnesses:
ALBERT W. BROWN,
EDWIN W. BROWN.